US010371953B2

(12) United States Patent
Aoki

(10) Patent No.: US 10,371,953 B2
(45) Date of Patent: Aug. 6, 2019

(54) IMAGE DISPLAY SYSTEM AND INFORMATION PROCESSING APPARATUS AND CONTROL METHODS THEREOF

(71) Applicant: CANON KABUSHIKI KAISHA, Tokyo (JP)

(72) Inventor: Norihito Aoki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/692,063

(22) Filed: Aug. 31, 2017

(65) Prior Publication Data

US 2018/0088334 A1 Mar. 29, 2018

(30) Foreign Application Priority Data

Sep. 26, 2016 (JP) ................................ 2016-187476

(51) Int. Cl.
*G02B 27/01* (2006.01)
*G06F 3/14* (2006.01)
(Continued)

(52) U.S. Cl.
CPC ..... *G02B 27/0172* (2013.01); *G02B 27/0093* (2013.01); *G02B 27/017* (2013.01); *G06F 3/14* (2013.01); *G06F 3/1407* (2013.01); *G06T 1/20* (2013.01); *G02B 2027/014* (2013.01); *G02B 2027/0138* (2013.01); *G09G 2330/021* (2013.01); *G09G 2340/0407* (2013.01); *G09G 2354/00* (2013.01)

(58) Field of Classification Search
CPC . H04W 52/0251; H04W 74/002; G06F 3/011; G06F 3/012; G06F 3/013; G06F 3/14; G06F 1/163; G06F 3/0346; G06F 3/04815; G02B 27/017; A63F 13/327; A63F 2300/8082; A63F 13/33; A63F 13/335; A63F 2300/66; G06T 11/00; G06T 15/00; G06T 13/40; G06T 19/003; G06T 19/006
See application file for complete search history.

(56) References Cited

U.S. PATENT DOCUMENTS

2004/0227699 A1* 11/2004 Mitchell ................ A61B 3/113
345/44
2006/0248571 A1* 11/2006 Ruge ......................... G06F 3/14
725/135

(Continued)

FOREIGN PATENT DOCUMENTS

JP 2016045814 A 4/2016

*Primary Examiner* — Sultana M Zalalee
(74) *Attorney, Agent, or Firm* — Rossi, Kimms & McDowell LLP

(57) ABSTRACT

This invention suppresses the narrowing of the communication band between a device and an information processing apparatus that form an image display system. Hence, an HMD of a user includes a sensor that detects a position and orientation, a communication interface that transmits, to the information processing apparatus, position and orientation information representing the detected position and orientation and receives a CG command from the information processing apparatus, a rendering unit that renders a CG based on the received CG command, and a display control unit that displays the rendered CG on a display unit.

9 Claims, 13 Drawing Sheets

(51) Int. Cl.
*G06T 1/20* (2006.01)
*G02B 27/00* (2006.01)

(56) References Cited

U.S. PATENT DOCUMENTS

| | | | | |
|---|---|---|---|---|
| 2009/0109241 | A1* | 4/2009 | Tsujimoto | H04N 7/18 345/633 |
| 2009/0241433 | A1* | 10/2009 | Naito | A63G 31/00 52/9 |
| 2010/0295868 | A1* | 11/2010 | Zahnert | H04N 1/107 345/634 |
| 2011/0164163 | A1* | 7/2011 | Bilbrey | G06F 1/1694 348/333.01 |
| 2012/0230607 | A1* | 9/2012 | Yamaji | H04N 1/3877 382/296 |
| 2014/0059114 | A1* | 2/2014 | Kim | H04L 67/42 709/203 |
| 2014/0204119 | A1* | 7/2014 | Malamud | G06T 19/006 345/633 |
| 2014/0364212 | A1* | 12/2014 | Osman | A63F 13/213 463/31 |
| 2015/0331813 | A1* | 11/2015 | Perrin | G06F 13/00 345/522 |
| 2017/0180756 | A1* | 6/2017 | Tuffreau | G06F 17/5086 |

* cited by examiner

IMAGE DISPLAY SYSTEM AND INFORMATION PROCESSING APPARATUS AND CONTROL METHODS THEREOF

BACKGROUND OF THE INVENTION

Field of the Invention

The present invention relates to an image display system and an information processing apparatus and control methods thereof.

Description of the Related Art

As a technique of seamlessly combining the physical world and the virtual world in real time, a technique of presenting a mixed reality (MR) is known. As one method of implementing a system using this MR technique, there is a method of using a video see-through head mounted display (to be simply referred to as HMD hereinafter). In this MR system, the field-of-view region (physical space) of an HMD user is captured by a camera, and a video obtained by synthesizing a CG (computer: graphics) on the captured image is displayed on a display device of the HMD. A literature, Japanese Patent Laid-Open No. 2016-45814 discloses an arrangement in which an HMD includes a camera for outputting a video used for detecting the field-of-view region and a position and orientation and displays a CG video returned from a CG processing apparatus. In this literature, the sight line and the information about the surrounding environment of an HMD (device) are transmitted to a CG processing apparatus (host), and a CG video generated based on these pieces of information is rendered and encoded in the CG processing apparatus and transmitted back to the HMD. In the proposed method, the HMD decodes the received encoded video and superimposes the decoded video on the sight-line video.

According to the above-described literature, the CG processing apparatus transmits the CG-rendered video to the HMD. Hence, the transfer amount of the video transmitted by the CG processing apparatus to the HMD will problematically increase in accordance with the increase in the resolution of the video.

SUMMARY OF THE INVENTION

According to an aspect of the invention, there is provided an image display system that includes a device which includes a display unit configured to display an image to a user and an information processing apparatus which transmits information to display a CG on the device, wherein the device comprises a position and orientation detecting unit configured to detect a position and orientation of the device, a first communication unit configured to transmit, to the information processing apparatus, position and orientation information related to a detected position and orientation and receive a CG command from the information processing apparatus, a rendering unit configured to render: a CG based on the CG command received via the first communication unit, and a display control unit configured to display, on the display unit, the CG rendered by the rendering unit, and the information processing apparatus comprises a second communication unit configured to receive the position and orientation information from the device, and transmit a CG command to the device, and a CG command generating unit configured to generate a CG command to be transmitted to the device, based on the position and orientation information received from the second communication unit.

According to the present invention, it is possible to suppress the narrowing of the communication band between information processing apparatuses and devices forming an image display system.

Further features of the present invention will become apparent from, the following description of exemplary embodiments (with reference to the attached drawings).

DESCRIPTION OF THE EMBODIMENTS

Embodiments according to the present invention will be described in detail below with reference to the accompanying drawings. Note that components of the embodiments to be described below are merely exemplary, and the present invention is not limited to them.

[First Embodiment]

Figure 1:
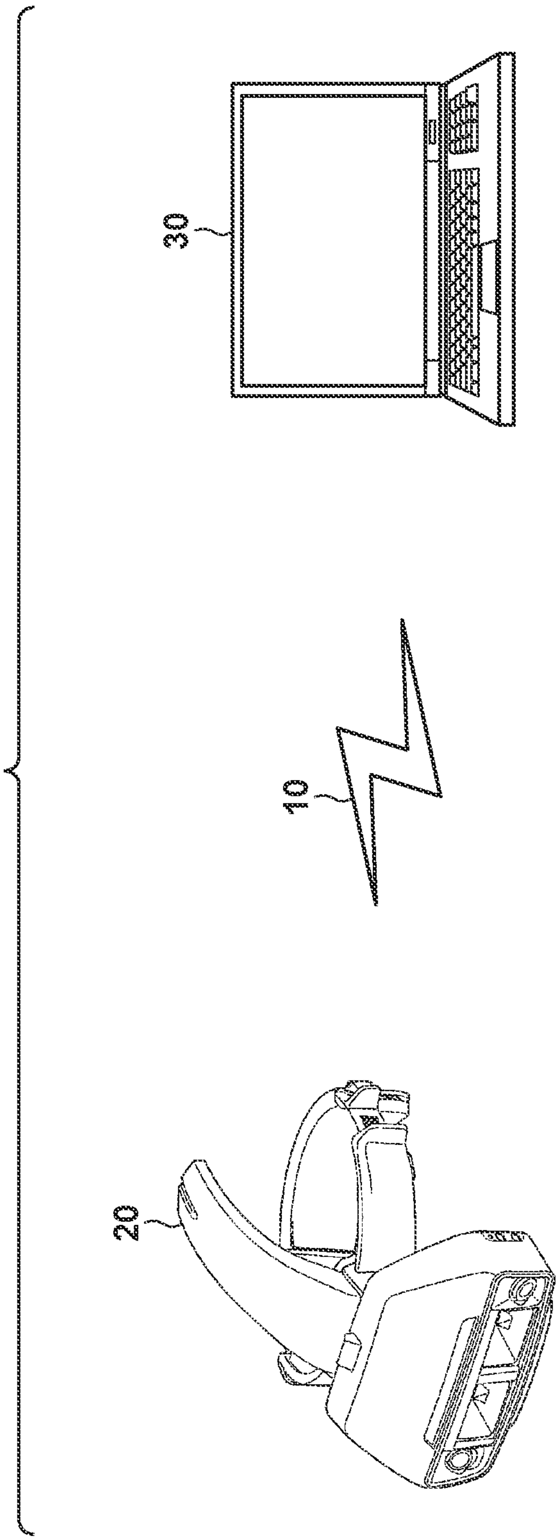
FIG. 1 is a view showing an HMD system according to the first embodiment.

FIG. 1 shows a mixed reality presentation system, according to this embodiment. The mixed reality presentation system, is formed by a head mounted, display (to be referred to as an HMD hereinafter) 20, a CG command generating apparatus 30, and a communication path 10 for data transmission and reception between the two apparatuses. The communication path 10 may be wired or wireless. In the case of a wired communication path, a high-speed transmission standard such, as the IEEE802.3 standard, Ethernet®, or Infiniband® can be used. If the communication path 10 is wireless, the IEEE802.11a/b/g/n/ac/ad/ax standards can be used, as a matter of course or a similar standard. such as IEEE802.15.3c or Bluetooth® can be used. The HMD 20 transmits, to the CG command generating apparatus 30 by using a communication function, an image obtained by performing image capturing using a self-equipped camera and the position and orientation information obtained by determining its own position and orientation by using a position and orientation sensor. Further, the HMD 20 renders a CG by using a CG command received via the communication function, superimposes the CG onto the obtained video, and displays the resultant video on the display.

Here, as the CG command that is to be generated by the CG command generating apparatus 30, a CG command such as OpenGL, OpenGL ES, OpenCL, DirectX® or the like can be used. The CG command generating apparatus 30 displays the video received from the HMD 20 while generating a CG command based on the position and orientation information received from, the HMD 20 via the communication function, and transmitting the generated, command to the HMD 20. The CG command generating apparatus 30 can be implemented by an information processing apparatus represented by a general personal computer. Also, the HMD 20 shown in this embodiment can be implemented by using a PC, a tablet, or a smartphone having the same components. That is, it can be any device that has an image capturing function, (in the case of a video see-through device), a position and orientation detection function, and a display function.

Figure 2:
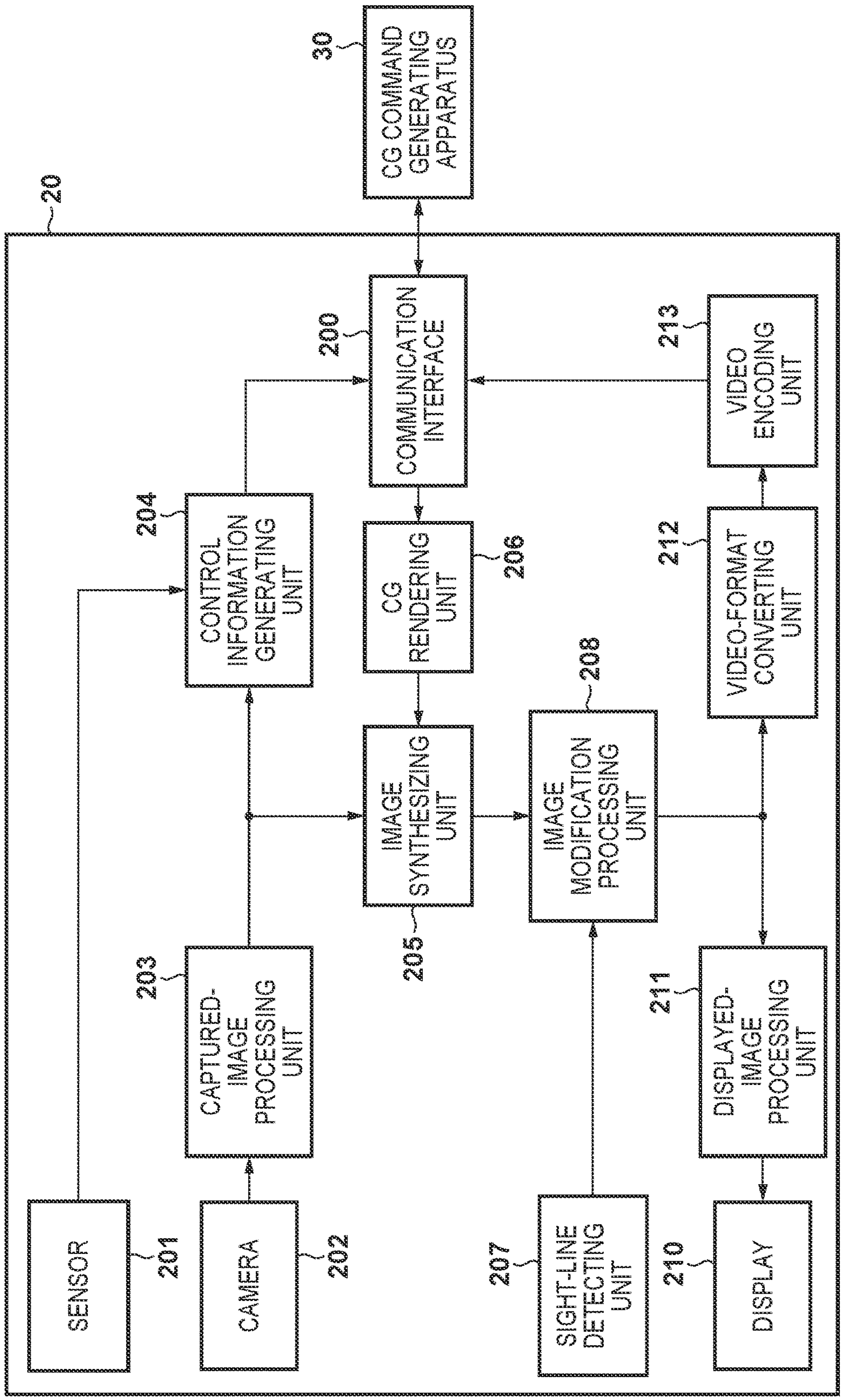
FIG. 2 is a block diagram showing the arrangement of an HMD according to the first embodiment.

FIG. 2 shows the arrangement of the HMD 20 according to this embodiment. A camera 202 captures, for example, 30 frames per second (30 FPS) and supplies the captured image (to be simply referred to as an image hereinafter) to a captured-image processing unit 203. The captured-image processing unit 203 performs preset image processing on the input image. The image processing described here is gain correction, pixel deficiency correction, automatic exposure correction, distortion aberration correction, and the like. When outputting an image that has undergone image processing, the captured-image processing unit 203 adds, to the image, specific information (to be referred to as reference video frame information M hereinafter) for specifying the image. The reason for adding this reference video frame information M is to prevent the CG generated by the CG command generating apparatus 30 from, becoming synthesized with temporally shifted captured images. For example, assume that the CG command generating apparatus 30 has generated a CG command for a given frame i. In this case, the HMD 20 needs to synthesize the CG generated by this CG command and the image of the frame i instead of synthesizing the generated CG and the image of an immediately preceding frame i−1. Using the reference video frame information M is effective particularly when the HMD 20 and the CG command generating apparatus 30 are to perform, wireless communication with each other. In the case of wireless communication, it is highly possible for a communication failure to occur. Note that if it is set so that the shifting of an image due to a communication failure will be returned in 1 sec, the captured-image processing unit 203 can include a counter (a 5-bit counter will suffice) that can count up a range from 0 to 30 (since the camera 202 performs image capturing at 30 EPS in this embodiment) each time a captured image of one frame is received.

The description returns to FIG. 2. A control information generating unit 204 generates, in accordance with each image output from the captured-image processing unit 203 and the sensor information output from a sensor 201, the position and orientation information in a three-dimensional space of the HMD 20. This position and orientation information includes the coordinates in the three-dimensional space of the HMD 20, the sight-line direction of the HMD 20 (camera 202), the rotation angle of the HMD 20 with respect to the sight-line direction axis, and the like. The sensor information can be information such as the acceleration rate or the direction of the HMD obtained by using a gyroscope. The control information generating unit 204 outputs the reference video frame information M received from the captured-image processing unit 203 and the position and orientation information to a communication interface 200. The communication interface 200 transmits the reference video frame information M received from the captured-image processing unit 203 and the position and orientation information as the control information of the HMD 20 to the CG command generating apparatus 30.

A CG rendering unit 206 obtains the CG command including the reference video frame information M from the CG command generating apparatus 30 via the communication interface 200. Then, the CG rendering unit 206 renders a CG (virtual object) in accordance with the obtained CG command. Subsequently, the CG rendering unit 206 supplies the reference video frame information M and the rendered CG to an image synthesizing unit 205.

The image synthesizing unit 205 receives the synthesis target video and the reference video frame information M of the video from the captured-image processing unit 203 and receives the CG and the reference video frame information M of the CG from the CG rendering unit 206. If the reference video frame information M of the video and that of the CG match, the image synthesizing unit synthesizes the CG from the CG rendering unit 206 with the image from, the captured-image processing unit 203 and outputs the synthesized image to an image modification processing unit 208. If the reference video frame information M from the captured-image processing unit 203 and the reference video frame information M from the CG rendering unit 206 do not match, the image synthesizing unit 205 waits until it receives the CG which has the matching reference video frame information M. However, an image needs to be displayed on a display 210 at a frame rate of 30 EPS. Hence, the wait time of the image synthesizing unit 205 is until a predetermined time before the display timing of an image of interest from the captured-image processing unit 203. If the CG having the reference video frame information M which matches that of the image of interest is not received at this timing, the image synthesizing unit 205 skips the synthesizing processing and outputs the intact image from the captured-image processing unit 203 to the image modification processing unit 208. Note that it may be set so as to display a CG-synthesized image which has been previously displayed. In this case, although it will seem as if the video has stopped for the user of the HMD since the same image will be displayed, the CG will be displayed. Also, the user may select in advance which method is to be adopted.

A sight-line detecting unit 207 detects the position of each pupil of the user using the HMD 20 and supplies, to the image modification processing unit 208, sight-line information that indicates which position the user is seeing on the display 210 as the coordinate data. The time interval of sight-line detection by the sight-line detecting unit 207 is the same as or shorter than the frame interval of the frame rate of the camera 202.

The image modification processing unit 208 performs image modification processing by determining, based on the latest sight-line coordinate data of the user, a region to modify in the image (a synthesized image of the captured image and the CG) obtained from the image synthesizing unit 205. More specifically, in the image from the image synthesizing unit 205, no modification processing is performed within a predetermined range centered about the sight-line direction of the user, and modification processing such as blurring is performed on a region outside this range. This is because human vision becomes more insensitive to a region that is further outside the sight-line direction. Furthermore, the blurring processing can be implemented by, for example, filter processing. As a representative filter, a smoothing filter can be applied. Blurring can minimize the difference between adjacent pixels, and thus a higher encoding efficiency can be expected. Note that in order to increase the encoding efficiency, thinning processing or the like may be performed to reduce the number of pixels instead of performing the blurring processing.

A displayed-image processing unit 211 functions as a display controller that controls the display 210. After image processing, for example, γ correction or the like, corresponding to the display 210 has been performed on the image that has been modified by the image modification processing unit 208, the displayed-image processing unit 211 outputs the processed image to the display 210. As a result, the user can see the image as a video. A video-format converting unit 212 converts the modified image from the image modification processing unit 208 into the input format of a video encoding unit 213. The video encoding unit 213 compresses the video output by the video-format converting unit 212 and outputs the compressed video to the communication interface 200. Here, as the video compression method, the H.264 or H.265 (HEVC) standard can be used. Alternatively, a lossless compression method may be used. The communication interface 200 transmits the compressed encoded data to the CG command generating apparatus 30.

The arrangement and the processing content of each unit of the HMD 20 according to the embodiment have been described above. The arrangement and the processing content of each unit of the CG command generating apparatus 30 according to the embodiment will be described next with reference to FIG. 3.

Figure 3:
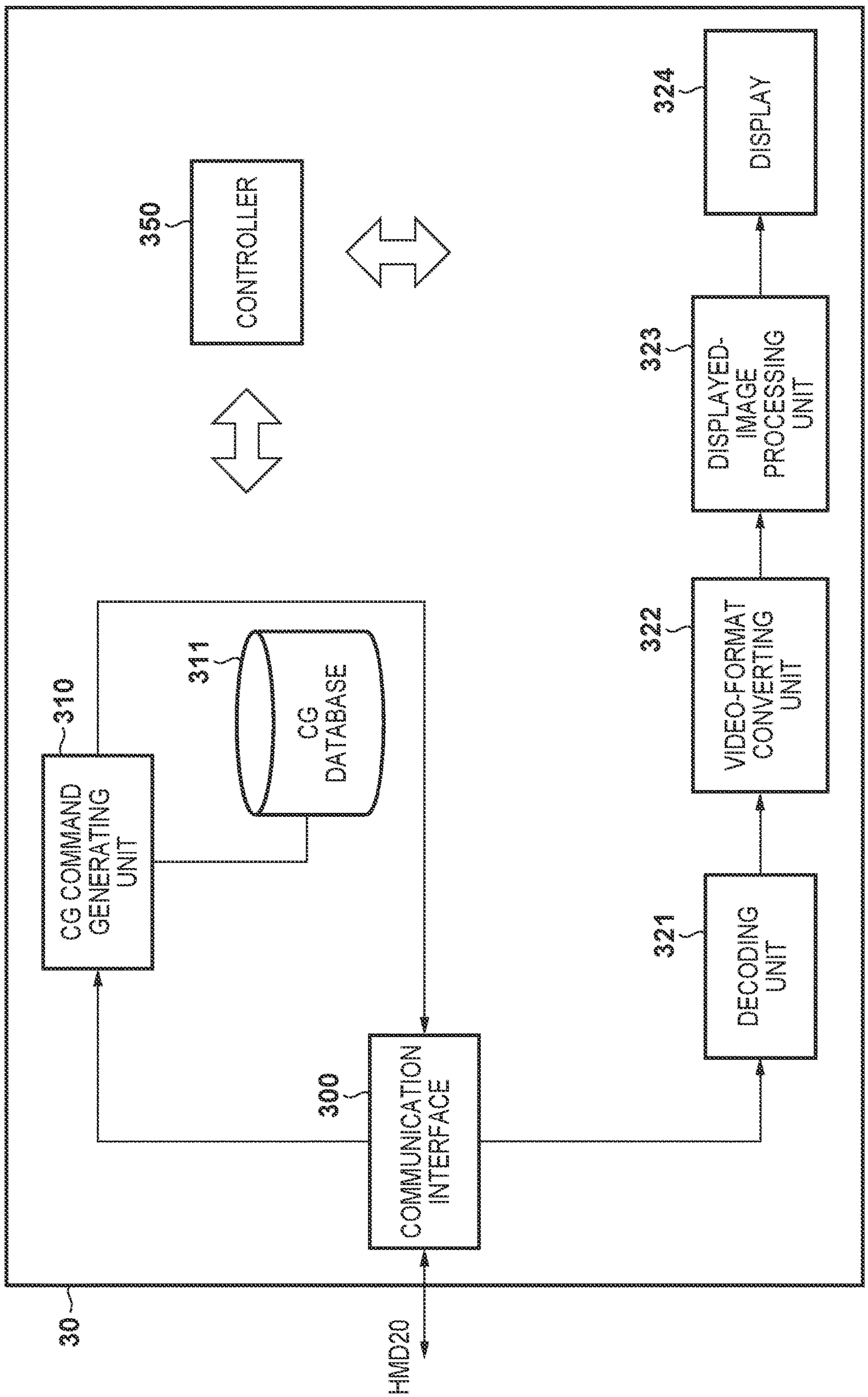
FIG. 3 is a block diagram showing the arrangement of a CG command generating apparatus according to the first embodiment.

In FIG. 3, a controller 350 is in charge of controlling the overall apparatus and is formed from a ROM which stores programs, a CPU which executes the programs, a RAM which is used as a work area, and the like. A CG command generating unit 310 obtains the position and orientation information and the reference video frame information M via a communication interface 300. Next, the CG command generating unit 310 refers to a CG database 311 based on the obtained position and orientation information and generates a CG command for rendering a CG object which is to be seen in the field of view of the camera 202 of the HMD 20. Subsequently, the CG command generating unit 310 transmits the generated CG command together with the received reference video frame information M to the HMD 20 via the communication interface 300.

A decoding unit 321 decodes the compressed video data obtained via the communication interface 300 and supplies the decoded image to a video-format converting unit 322. The video-format converting unit 322 converts the supplied image into a video format suitable for a display 324. For example, a conversion from Bayer format to RGB format or its inversion can be performed. A displayed-image processing unit 323 performs correction according to the characteristics of the display 324, for example, γ correction or the like, on the video output from video-format converting unit 322 and outputs the corrected video to the display 324.

The arrangement and the processing content of each unit of the CG command generating apparatus 30 according to the embodiment has been described above. Note that processing units other than the communication interface 300 and the display 324 may be implemented by executing a program by the controller 350.

Figure 4:
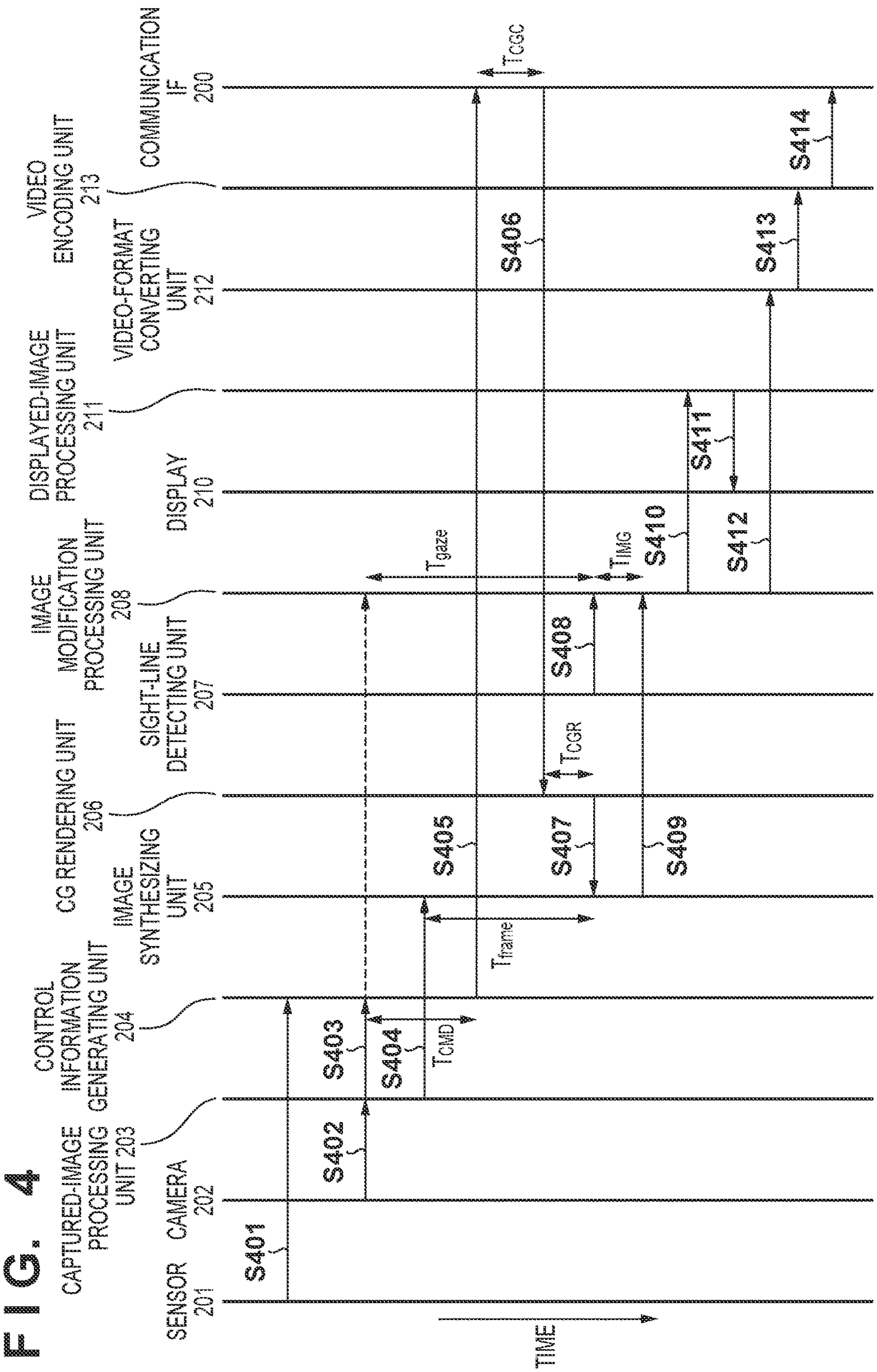
FIG. 4 is a sequence chart showing the processing sequence of the HMD according to the first embodiment.

The processing sequence of the HMD 20 according to the embodiment will be described next with reference to FIG. 4. Note that FIG. 4 shows a sequence related to the image capturing processing of an image of one frame by the camera 202. Since the camera 202 of this embodiment performs capturing at 30 FPS, FIG. 4 shows the processing sequence performed in a period of 1/30 sec.

In S401, sensor information from the sensor 201 is supplied to the control information generating unit 204. In S402, the camera 202 supplies an image obtained by image capturing to the captured-image processing unit 203, and image processing is executed on the image. In S403, the captured-image processing unit 203 supplies the reference video frame information M and the image which has undergone image processing to the control information generating unit 204. In S405, the control information generating unit 204 transmits the control information of the HMD 20, including the reference video frame information M and the position and orientation information, to the CG command generating apparatus 30 via the communication interface 200. The time required from when the control information generating unit 204 receives the captured image and the sensor information until the transmission processing of the control information of the HMD 20 is period $T_{CMD}$.

In S404, the captured-image processing unit 203 outputs the reference video frame information M and the captured image to the image synthesizing unit 205. The image synthesizing unit 205 buffers the received reference video frame information M and the captured image for a predetermined period to wait for the CG which is to be superimposed to be rendered. This period is called $T_{frame}$.

In S406, the CG rendering unit 206 obtains the reference video frame information M and a CG command via the communication interface 200. At this time, $T_{CGC}$ is the period from when the position and orientation information is transmitted by the communication interface 200 until the CG command is received by the CG rendering unit 206. In S407, the CG rendering unit 206 renders a CG video based on the received CG command and supplies the rendered CG video to the image synthesizing unit 205. Here, $T_{CGR}$ is the processing delay of CG rendering.

Assuming that the outputs of S403 and S404 are performed at almost the same time, the period $T_{frame}$ until a video is held is $T_{frame} \geq T_{CMD}+T_{CGC}+T_{CGR}$.

In S408, the sight-line detecting unit 207 outputs the detected sight-line coordinate information to the image modification processing unit 208. At this time, $T_{gaze}$ is the period from when the video of each eye has been obtained in S403 until the sight line is obtained as coordinate data. The image modification processing unit 208 does not buffer the video if $T_{gaze} \leq T_{CMD}+T_{CGC}+T_{CGR}$ is satisfied. Otherwise, the image modification processing unit 208 buffers the data until the time when the sight-line coordinate data is output. This period is $T_{IMG}$. In S409, the image synthesizing unit 205 superimposes the CG video onto the buffered image, and the superimposed video is output to image modification processing unit 208. As previously described, this superimposition processing is performed when the reference video frame information M of the buffered image and the reference video frame information M of the CG have matched. If a predetermined time has elapsed without the generation of a CG which has the matching reference video frame information M, the CG superimposition processing is not performed, and the captured image is supplied to the image modification processing unit 208.

In S410, the image modification processing unit 208 outputs the image which has been modified based on the position coordinates of the sight-line to the displayed-image processing unit 211. In S411, the displayed-image processing unit 211 outputs, to the display 210, the image corrected to be suitable for the display 210. In S412, the image modification processing unit 208 outputs the video which has been modified based on the sight-line position coordinates to the video-format converting unit 212. In S413, the video-format converting unit 212 outputs, to the video encoding unit 213, the video which has been converted to be suitable for the video encoding unit 213. In S414, the video encoding unit 213 outputs the compressed video data to the communication interface 200 so that the compressed encoded data is transmitted to the CG command generating apparatus 30.

Figure 5:
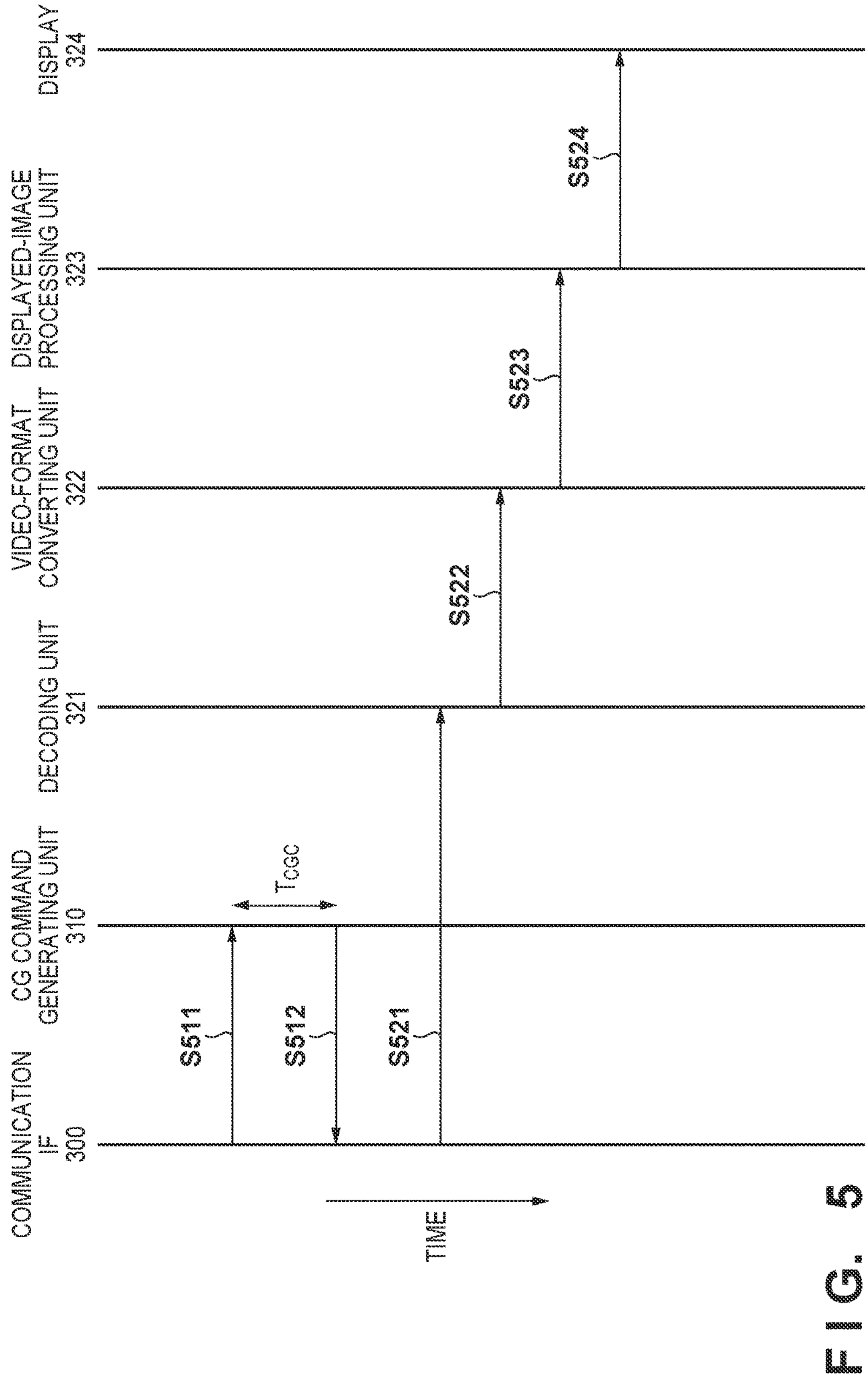
FIG. 5 is a sequence chart showing the processing sequence of the CG command generating apparatus according to the first embodiment.

The processing sequence of the CG command generating apparatus 30 according to the embodiment will be described next in accordance with FIG. 5.

In S511, the CG command generating unit 310 receives the control information of the HMD 20 via the communication interface 300. In S512, based on the position and orientation information in the received control information, the CG command generating unit 310 refers to the CG database 311 of the CG object with respect to the physical space and generates a CG command which is visible in the visual field of the camera 202 of the HMD 20. Next, the CG command generating unit 310 transmits the generated CG command and the reference video frame information M included in the control information to the HMD 20 via the communication interface 300. $T_{CGC}$ is the period from when the CG command generating unit 310 receives the control information until it transmits the CG command.

In S521, the decoding unit 321 receives the compressed video data via the communication interface 300 and decodes the data. In S522, the decoding unit 321 outputs the decoded image to the video-format converting unit 322. In S523, the video-format converting unit 322 outputs the converted image to the displayed-image processing unit 323. In S524, the displayed-image processing unit 323 performs suitable corrections for displaying the video on the display 324 and outputs the corrected video to the display 324.

Figure 6A:
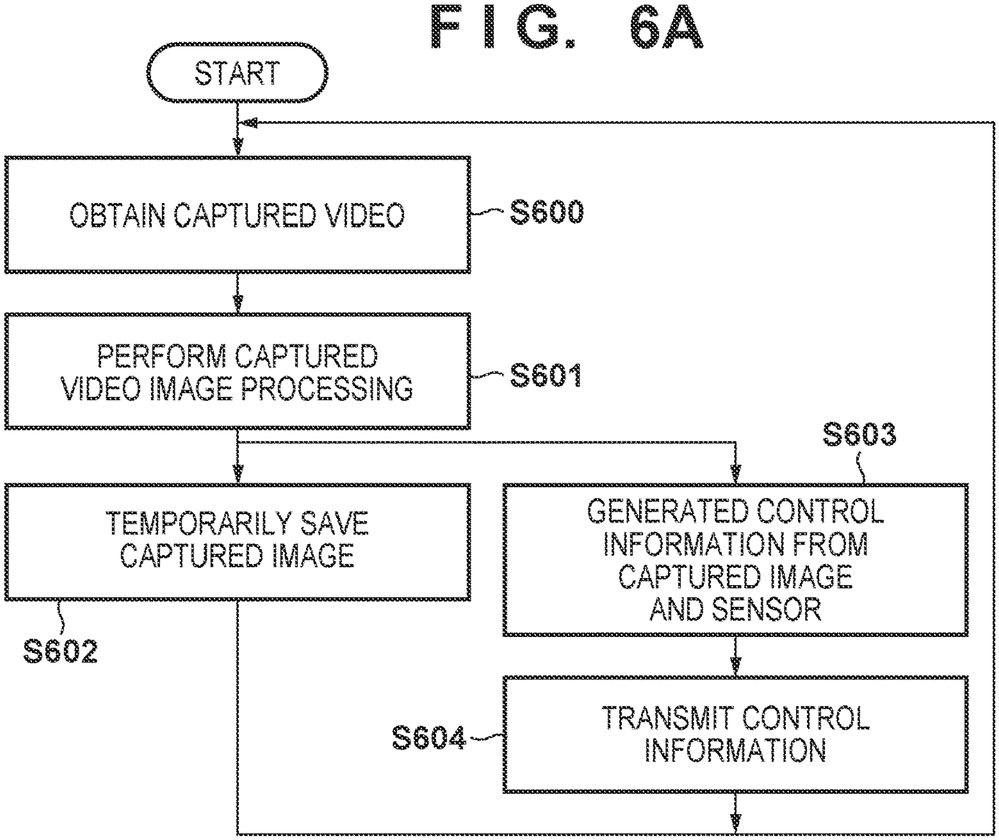
FIGS. 6A to 6C are flowcharts each showing the processing procedure of the HMD according to the first embodiment.
Figure 6B:
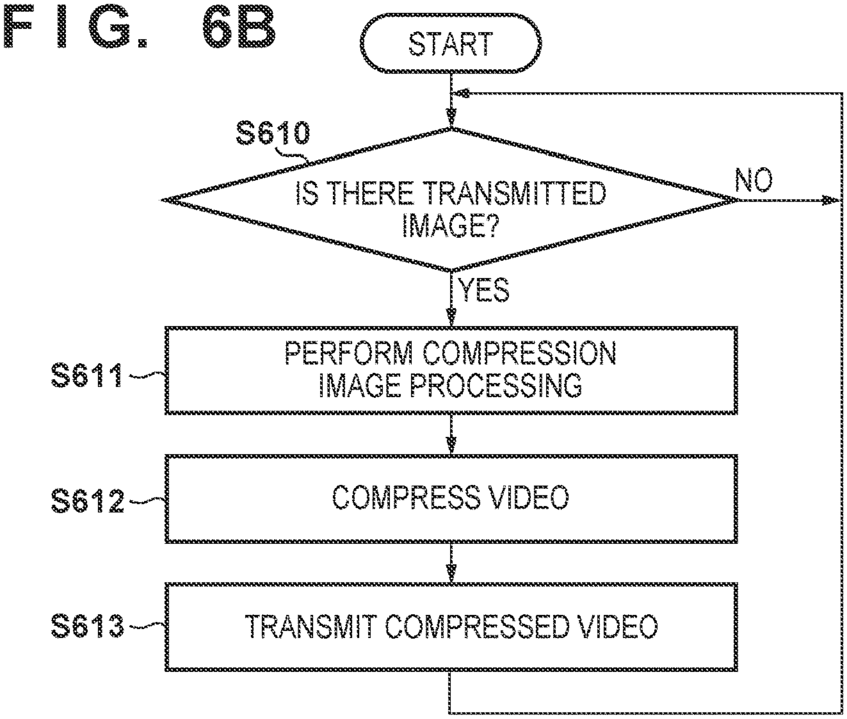
Figure 6C:
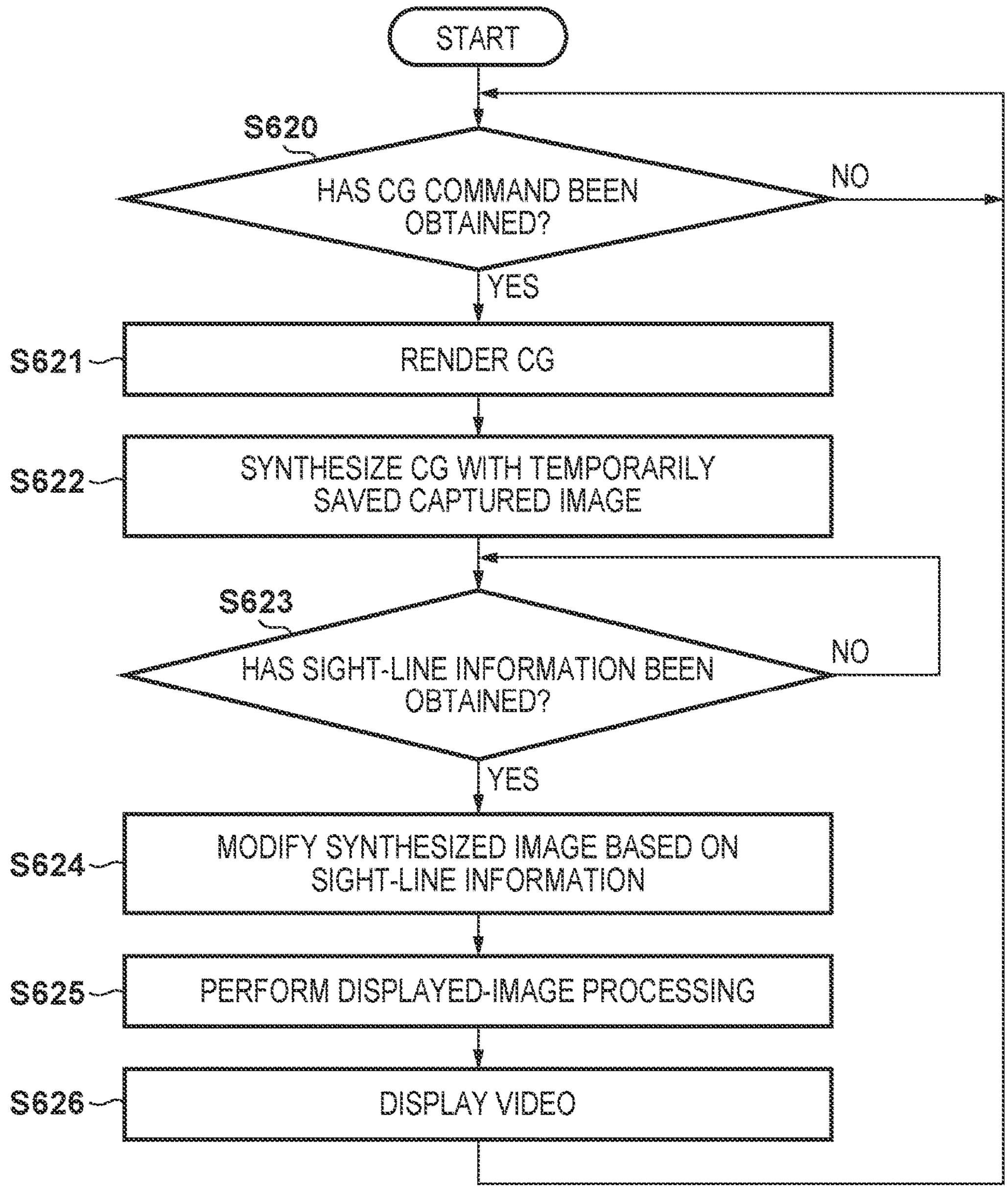

FIGS. 6A to 6C are flowcharts each showing the processing procedure of the HMD 20 according to this embodiment. FIG. 6A corresponds to the transmission processing of the control information of the HMD 20, FIG. 6B corresponds to the transmission processing of an image of the HMD 20, and FIG. 6C corresponds to the reception processing of a CG command.

First, an explanation will be given in accordance with FIG. 6A. In step S600, the camera 202 obtains a captured video and shares the captured image with the captured-image processing unit 203. In step S601, in addition to correcting the input image into a video format that can be processed by the control information generating unit 204, the captured-image processing unit 203 corrects the image so that the image will have the same video format as that of the CG rendering to be superimposed by the image synthesizing unit 205. In step S602, the image synthesizing unit 205 temporarily saves the input image. In step S603, the control information generating unit 204 generates the control information of the HMD 20 based on the sensor information from the sensor 201 and transmits, in step S604, the generated control information to the CG command generating apparatus 30 via the communication interface 200.

The processing at the time of the reception of a CG command will be described next in accordance with FIG. 6C. In step S620, the CG rendering unit 206 waits to receive a CG command via the communication interface 200. Upon receiving a CG command, the CG rendering unit 206 executes the CG command to generate a CG video in step S621. Next, in step S622, the image synthesizing unit 205 generates a superimposed image (synthesized image) by superimposing (synthesizing) the CG onto the temporarily saved captured image.

In step S623, the image modification processing unit 208 waits to receive the sight-line information from the sight-line detecting unit 207. Upon receiving the sight-line information, the superimposed image is modified based on the sight-line information in step S624. In step S625, the displayed-image processing unit 211 corrects the modified image so that it will be suitable for display on the display 210 and displays, in step S626, the corrected image on the display 210.

The transmission processing of an image will be described next in accordance with FIG. 6B. In step S610, the video-format converting unit 212 waits to receive the superimposed image from the image modification processing unit 208. In step S611, upon receiving the superimposed image, the video-format converting unit 212 converts the superimposed image so that it will be compatible with the input format of the encoding unit. Subsequently, in step S612, the video encoding unit 213 compresses the input superimposed image and transmits, in step S613, the compressed image data to the CG command generating apparatus 30 via the communication interface 200.

Figure 7A:
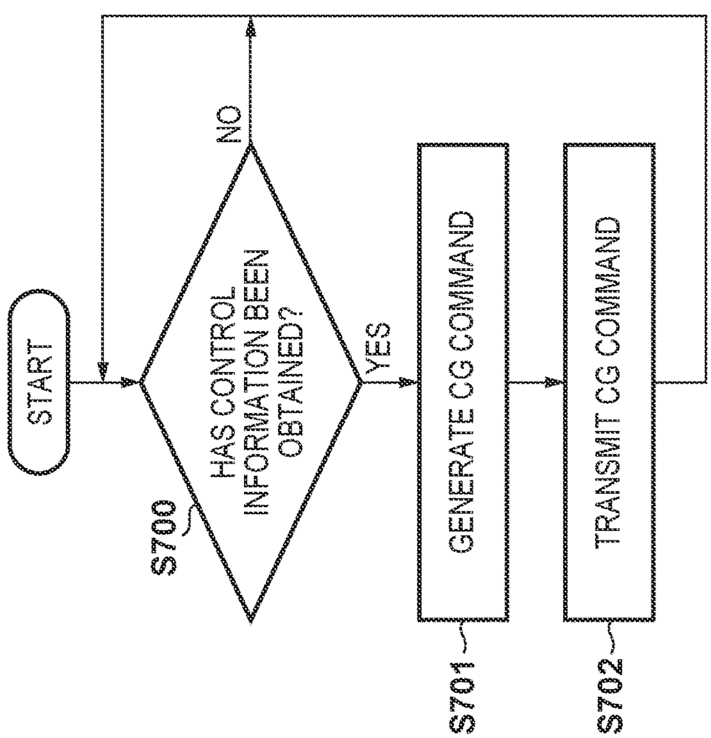
FIGS. 7A and 7B are flowcharts each showing the processing procedure of the CG command generating apparatus according to the first embodiment.
Figure 7B:
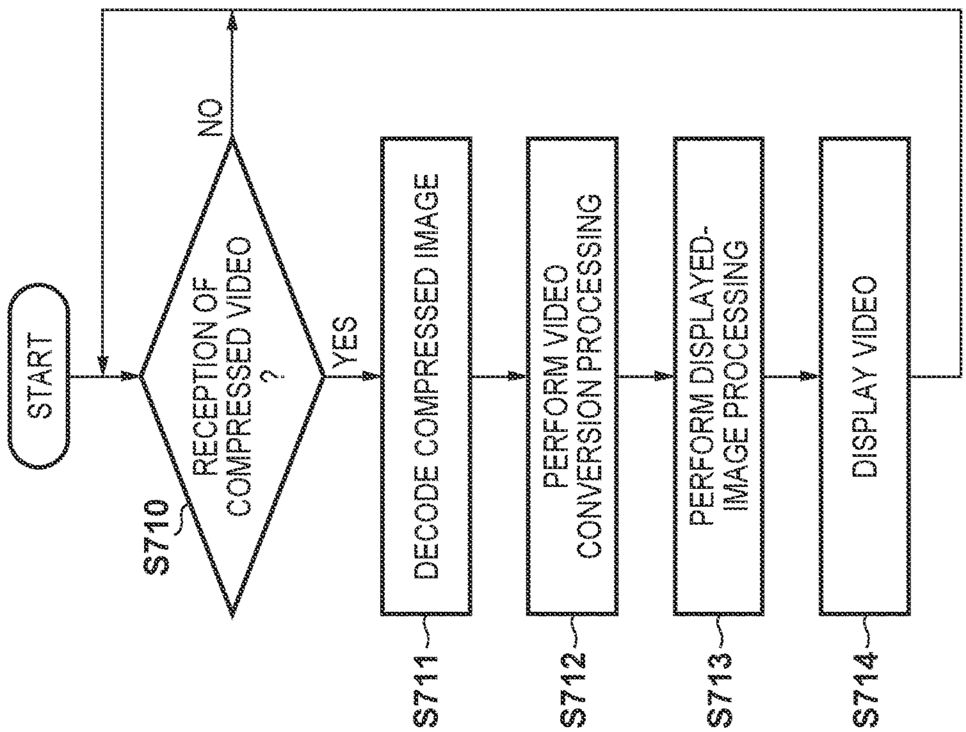

FIGS. 7A and 7B are flowcharts each showing the processing procedure of the CG command generating apparatus 30 according to this embodiment. FIG. 7A is a flowchart of CG command transmission processing, and FIG. 7B is a flowchart of image reception processing. The flowchart of FIG. 7A will be described first.

In step S700, the controller 350 waits to obtain (receive) the control information (the reference video frame information M and the position and orientation information) of the HMD 20 via the communication interface 300. Upon determining the obtainment of the control information, the controller 350 supplies the control information to the CG command generating unit 310. The CG command generating unit 310 generates, based on the position and orientation information of the HMD 20 included in the control information, a CG command to render a CG object that is to be seen in the field of view of the camera 202 of the HMD 20 (step S701). Subsequently, in step S702, the controller 350 transmits the CG command (including the reference video frame information M) generated by the CG command generating unit 310 from the communication interface 300 to the HMD 20.

The image reception processing will be described next in accordance with FIG. 7B.

In step S710, the controller 350 waits to obtain the compressed image data from the HMD 20 via the communication interface 300. Upon obtaining the compressed image data, the controller 350 supplies the compressed image data to the decoding unit 321 and causes the decoding unit 321 to perform decoding processing of the compressed image data in step S711. Next, in step S712, the controller 350 supplies the image data obtained from the decoding processing to the video-format converting unit 322. The video-format converting unit 322 converts the received image data into data of the input format of the display 324. Next, in step S713, the controller 350 controls and causes the displayed-image processing unit 323 to perform gamma correction on the image so that it will be suitable for display on the display 324. Subsequently, in step S714, the controller 350 causes the display 324 to display the corrected image data and returns the process to step S710 to prepare for the compressed image data of the next frame.

According to this embodiment as described above, the HMD 20 obtains and transmits the position and orientation information to the CG command generating apparatus 30, and the CG command generating apparatus 30 transmits a CG command to the HMD 20. As a result, narrowing of the transfer path can be suppressed compared to that when transmitting a synthesized image. The transfer amount of the CG command does not increase proportionately with the high resolution of the captured video. Hence, it can suppress the narrowing of the communication band even if the resolution of the camera of the HMD 20 is further increased. In addition, according to the embodiment, the HMD 20 performs compression-encoding processing after performing blurring such as smoothing or thinning processing in a region outside the sight-line direction of the user in an image captured by the camera 202. Therefore, the data amount per unit time of a synthesized image which is to be transferred from the HMD 20 to the outside (the CG command generating apparatus 30 in the embodiment) can be decreased.

Note that in the above-described embodiment, the CG rendering unit 206 in the HMD 20 renders a CG object by executing a CG command received from the CG command generating apparatus 30. This is not problematic when the CG object to be rendered has a comparatively simple shape since the data amount of the CG command used to draw the object can be decreased. However, the CG command amount increases as more complex the shape of the CG object to be rendered becomes. Hence, the CG rendering unit 206 of the HMD 20 is connected to a storage device that uses an object ID to categorize and store each of a plurality of CG objects seen from, a reference direction. Then, the CG command, generating apparatus 30 estimates, from the position and orientation information, the position and the direction of the object that is to be present in the field of view of the camera 202 of the HMD 20 and transmits the object ID, the visible direction, and the rendering magnification, and the like as a CG command to the HMD 20. As a result, it is possible to suppress an increase in the information amount to be transmitted from the CG command generating apparatus 30 to the HMD 20 even if the CG object has a complex shape.

[Second Embodiment]

The second embodiment will be described below. For the sake of descriptive convenience, an explanation for the same parts as those in the first embodiment will be omitted, and points which are different from those in the first embodiment will be described.

Figure 8:
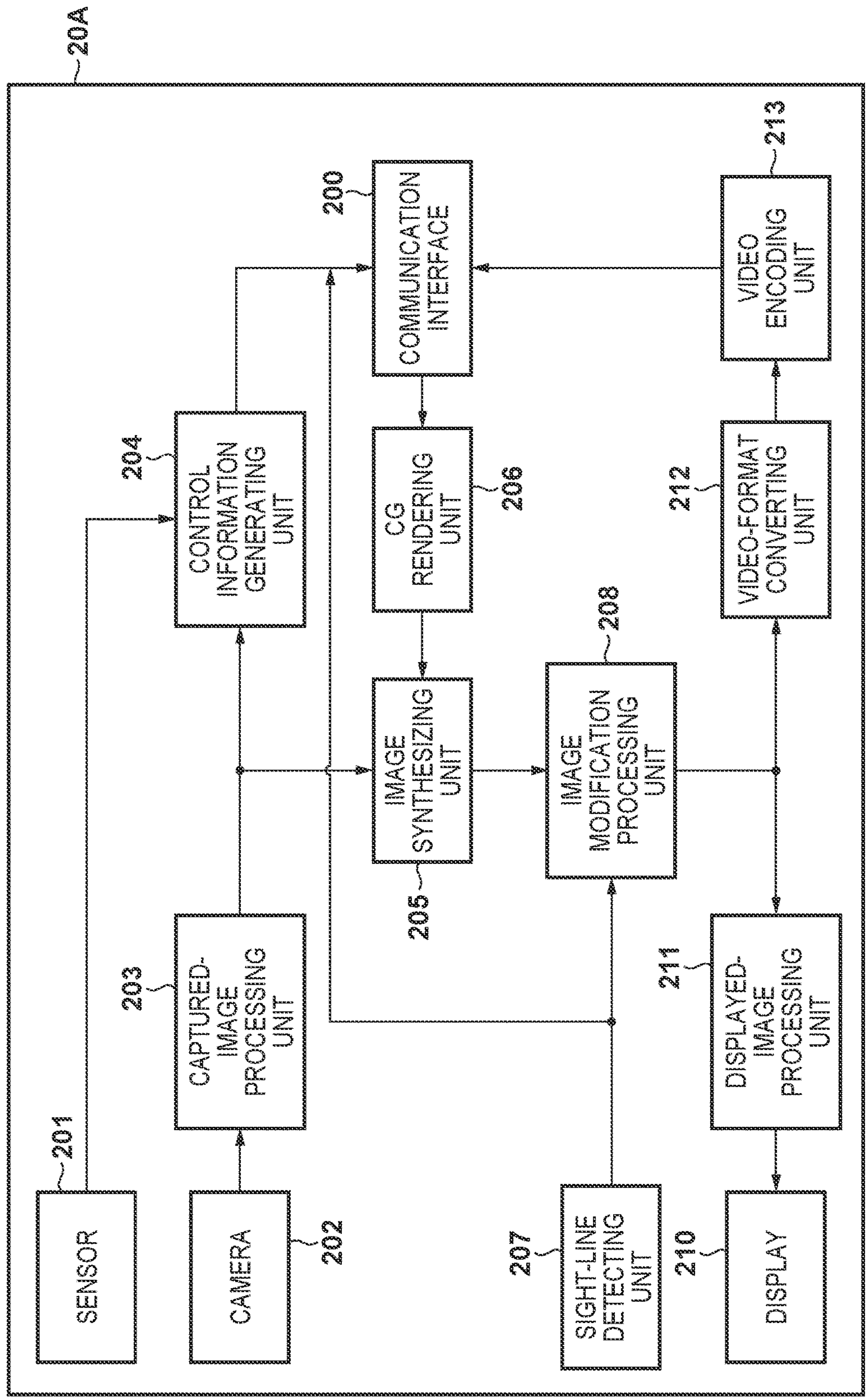
FIG. 8 is a block diagram showing the arrangement of an HMD according to the second embodiment.

FIG. 8 is a block diagram showing the arrangement of an HMD 20A according to the second embodiment. Points different from those in FIG. 2 are the point that a sight-line detecting unit 207 outputs the sight-line information indicating the sight-line direction of the user not only to an image modification processing unit 208 but also to a communication interface 200 and the point that the communication interface 200 transmits the sight-line information to a CG command generating apparatus 30. Note that the sight-line information can be included in the control information transmitted to the CG command generating apparatus 30.

A CG rendering unit 206 according to the second embodiment executes a CG command obtained from the communication interface 200 but performs low-resolution rendering on a peripheral region outside the sight line when performing CG rendering. As a result, the processing load of the CG rendering unit 206 can be reduced.

Figure 9:
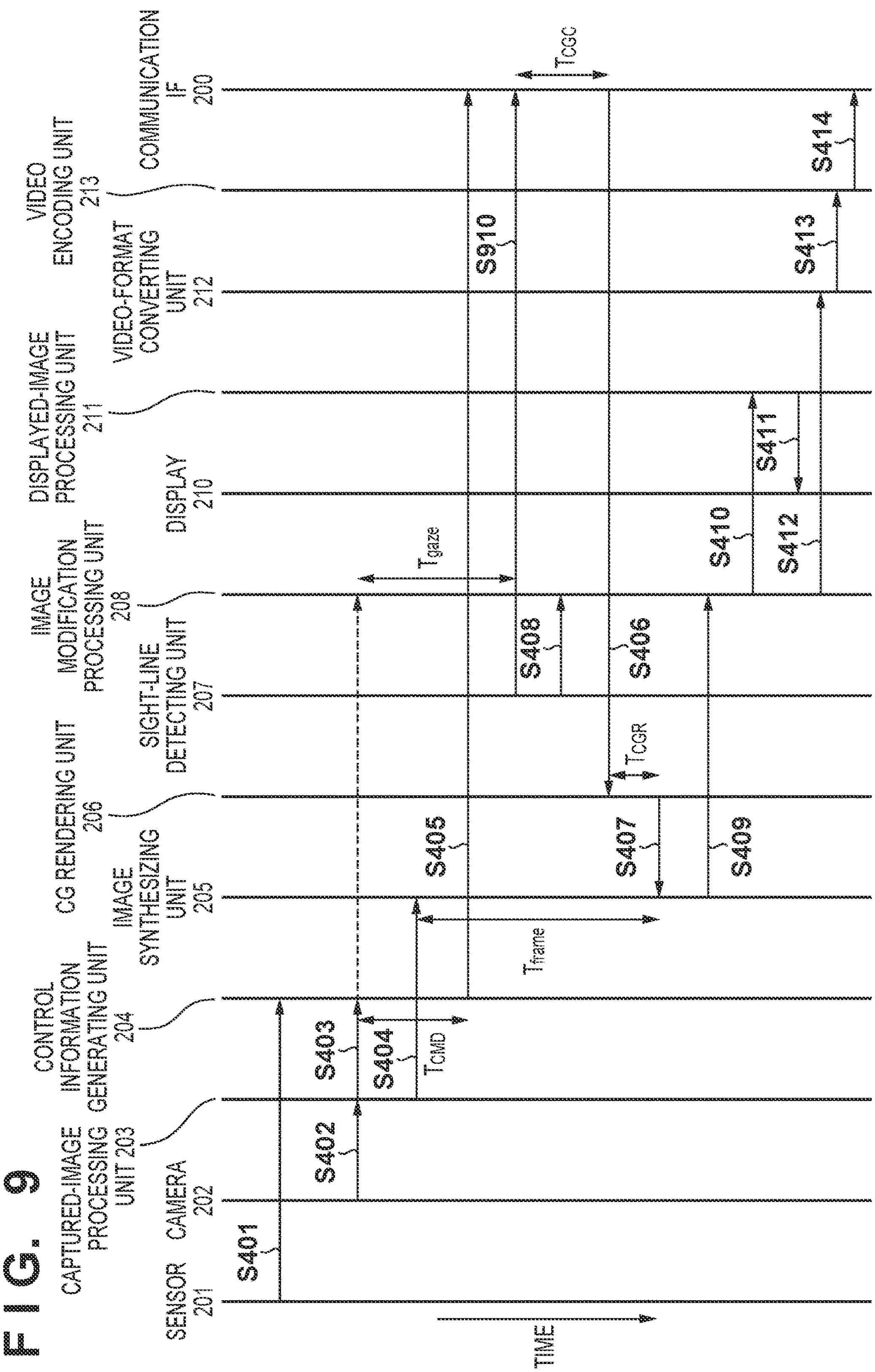
FIG. 9 is a sequence chart showing the processing sequence of the HMD according to the second embodiment.

FIG. 9 is a sequence chart showing the processing sequence of the HMD 20A according to the second embodiment. The processing of the HMD 20A will be described in accordance with FIG. 9 hereinafter.

In S910, the sight-line detecting unit 207 outputs the detected sight-line information to the communication interface 200. As a result, the communication interface 200 transmits the sight-line information to the CG command generating apparatus 30. At this time, if a period $T_{gaze}$ until the sight-line detecting unit 207 outputs the sight-line information is shorter than a period $T_{CMD}$ until the control information is generated, the timing of S910 is set before S405. Otherwise the timing of S910 is set after S405.

An image synthesizing unit 205 needs to buffer the video for a period until the CG to be superimposed is rendered. This period $T_{frame}$ is $T_{frame} \geq T_{CMD}+T_{CGC}+T_{CGR}$ when $T_{gaze} \leq T_{CMD}$. When $T_{gaze}>TCMD$, $T_{frame} \geq T_{gaze}+T_{CGC}+T_{CGR}$.

Figure 10:
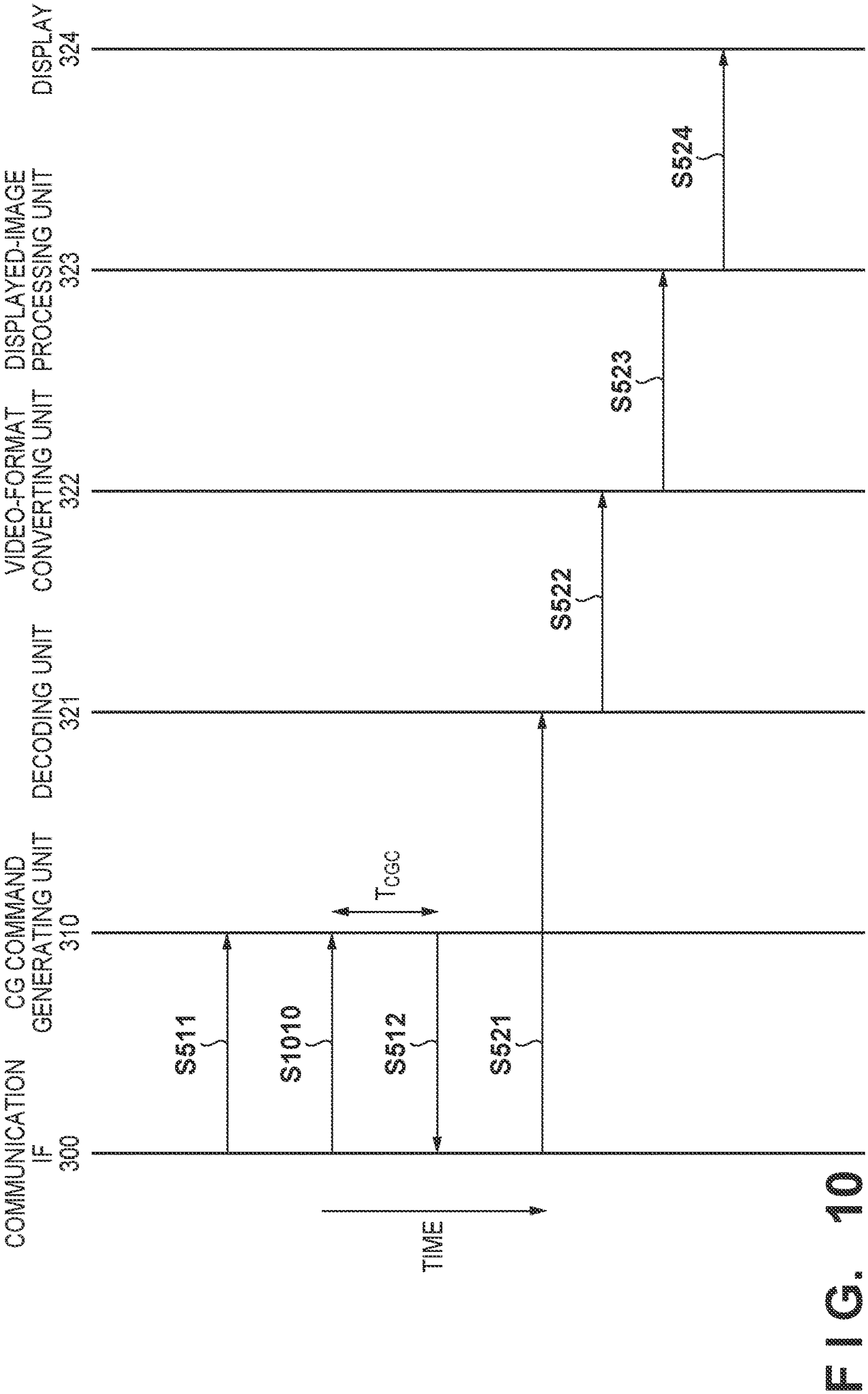
FIG. 10 is a sequence chart showing the processing sequence of the CG command generating apparatus.

FIG. 10 is a sequence chart showing the processing sequence of the CG command generating apparatus 30 according to the second embodiment.

In S1010, a CG command generating unit 310 obtains the sight-line information via a communication interface 300. Then, the CG command generating unit 310 starts the CG command generation processing after both the control information and the sight-line information have been obtained. $T_{CGC}$ is this processing delay.

Figure 11:
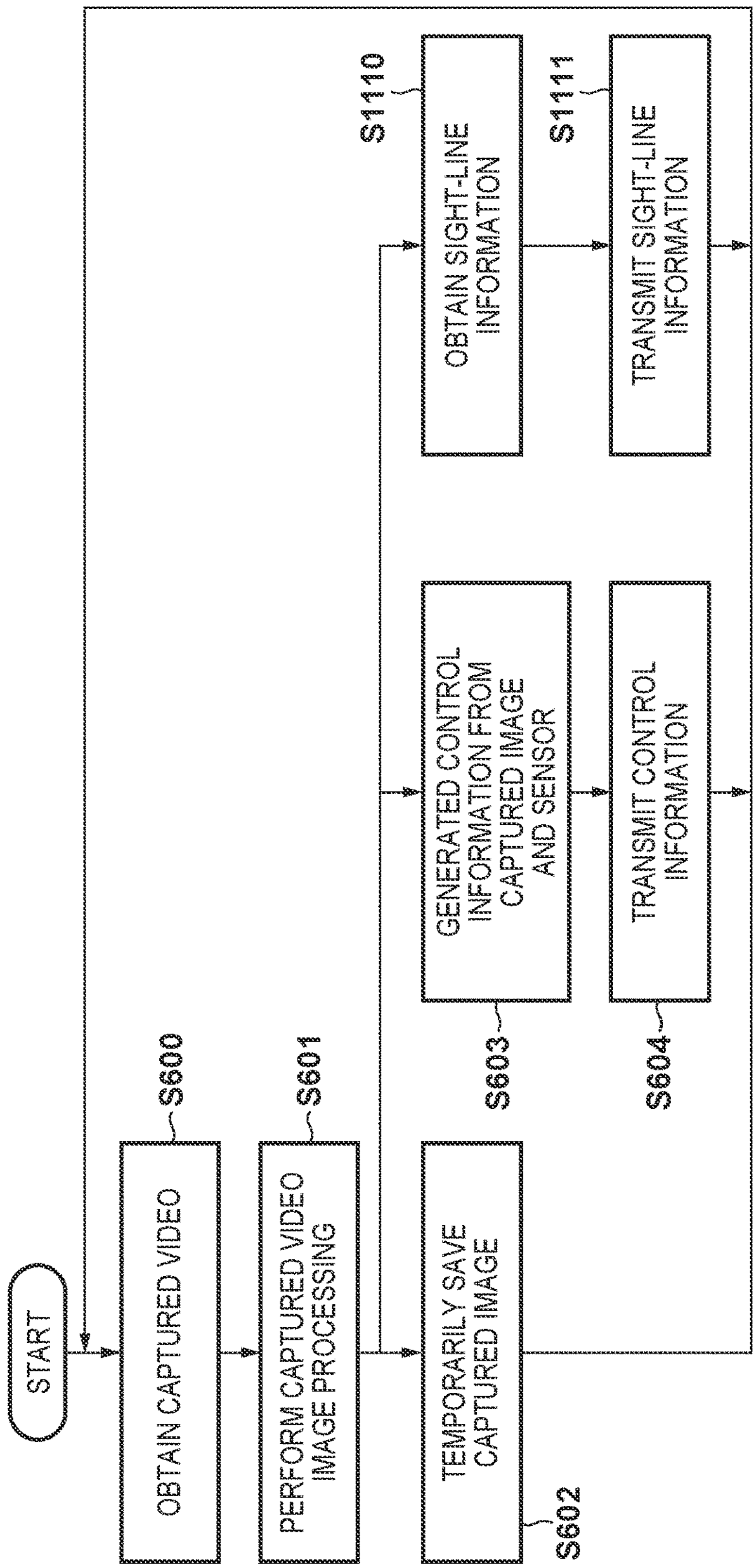
FIG. 11 is a flowchart showing the processing procedure of the HMD according to the second embodiment.

FIG. 11 is a flowchart showing the processing procedure of the HMD 20A according to the second embodiment. In step S1110, the communication interface 200 obtains the sight-line information from the sight-line detecting unit 207 and transmits, in step S1111, the sight-line information to the CG command generating apparatus 30.

Figure 12:
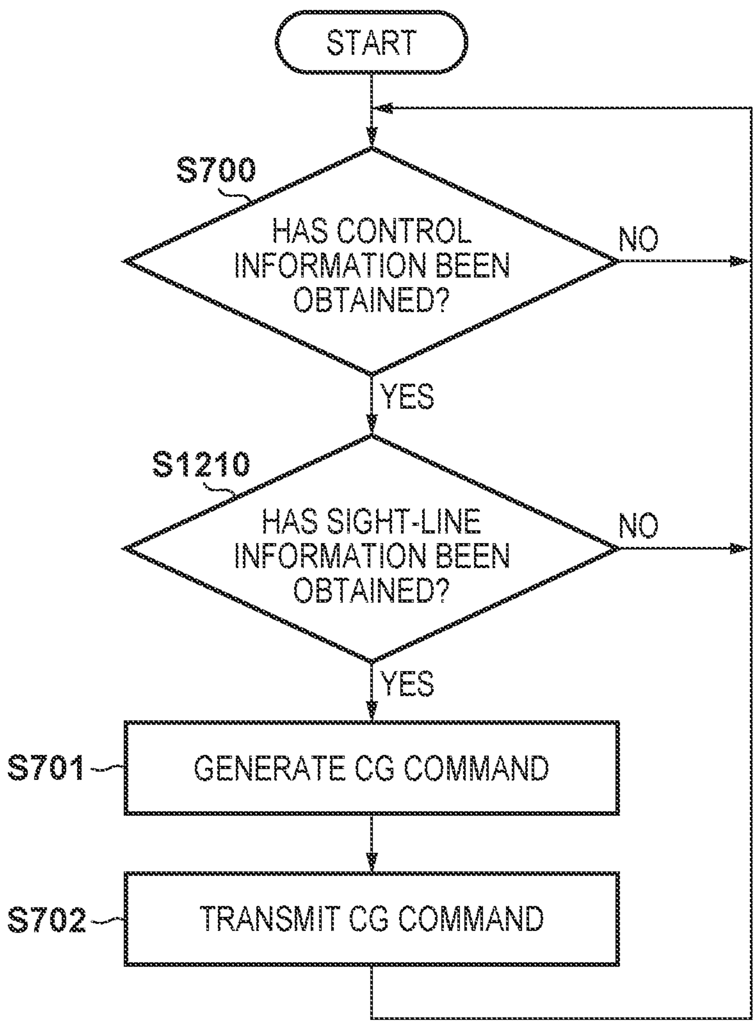
FIG. 12 is a flowchart showing the processing procedure of the CG command generating apparatus according to the second embodiment.

FIG. 12 is a flowchart showing the processing procedure of the CG command generating apparatus 30 according to the second embodiment. Upon receiving the control information from the HMD 20A via the communication interface 300, the controller 350 waits to obtain the sight-line information in step S1210. When the sight-line information has been obtained, the controller 350 outputs the sight-line information to the CG command generating unit 310. Otherwise, the controller 350 executes the process of step S700 again. Note that either step S700 or step S1210 can be executed first, and these steps may be combined into a single step by integrating the respective logical expressions.

In step S701, the CG command generating unit 310 generates a command to render a desired CG in a space by using the sight-line information from the position and orientation information in the obtained control information. At this time, as the CG command to be generated, a normal high-resolution rendering command is generated for a region within a predetermined range from a position indicated by the sight-line direction and a coarse CG command is generated for a region outside this range.

According to the second embodiment, in addition to the effects of the first embodiment, it is possible to reduce the processing load of the CG rendering unit and the power consumption by causing the HMD 20A to perform, in accordance with each received CG command, low-resolution CG rendering in a region which is away from the sight line.

Although the above-described first and second embodiments have described the HMD 20 as a video see-through HMD, it may be an optical see-through HMD. Furthermore, as long as an image capturing function, a display function, and a position and orientation detecting function are included, it may be a device such as a smartphone or the like. Note that the first and second embodiments are not limited to a mixed reality presentation system which presents a mixed reality by superimposing a CG on an image of a physical space and can be widely applied to an image display system such as a VR system.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-187476, filed Sep. 26, 2016, which is hereby incorporated by reference herein in its entirety.

What is claimed is:

1. An image display system comprising:

a computer graphics (CG) displaying device including a display device that displays an image to a user; and an information processing apparatus that transmits information for displaying CG on the display device, wherein the displaying device comprises:

an image capturing device configured to capture an image of a physical space; and a position and orientation detecting sensor that detects a position and orientation of the displaying device;

a first communication interface that communicates with the information processing apparatus;

at least one first processor or circuit configured to implement first instructions to execute a first plurality of tasks, including:

a first transmitting task that transmits, via the first communication interface, to the information processing apparatus, position and orientation information related to the position and orientation detected by the position and orientation detecting sensor and specific information for specifying a frame captured by the image capturing device;

a first receiving task that receives a CG command from the information processing apparatus;

a rendering task that renders CG based on the CG command received by the first receiving task;

a synthesizing task that synthesizes the CG on to the captured image of the physical space in a case where the specific information of the CG rendered by the rendering task and the specific information of a synthesizing target image match; and a display control task that controls to the display device to display the CG rendered by the rendering task and an image synthesized by the synthesizing task, and wherein the information processing apparatus comprises:

a second communication interface for communicating with the displaying device;

at least one second processor or circuit configured to implement second instructions to execute a second plurality of tasks, including:

a second receiving task that receives the position and orientation information and the specific information from the displaying device;

a CG command generating task that generates the CG command based on the position and orientation information and the specific information received from the displaying device; and a second transmitting task that transmits the generated CG command to the displaying device via the second communication interface.

2. The system according to claim 1, wherein:

the image capturing device captures the image of the physical space by a predetermined frame rate, the specific information for specifying the frame captured by the image capturing device specifies an image indicated thereby, and the first receiving task receives, from the information processing apparatus, the CG command together with the specific information.

3. The system according to claim 1, wherein:

the displaying device further comprises a sight-line detector that detects a sight-line direction of the user, and the first plurality of tasks include a modifying task that modifies, based on the sight-line direction detected by the sight-line detector, the synthesized image synthesized by the synthesizing task.

4. The system according to claim 3, wherein the modifying task blurs a region that exceeds a predetermined range from a position indicated by the sight-line direction in the synthesized image.

5. The system according to claim 4, wherein the display control task controls the display device to display an image modified by the modifying task.

6. The system according to claim 3, wherein:

the first transmitting task transmits, to the information processing apparatus, sight-line information representing the sight-line direction detected by the sight-line detector, and the CG command generating task generates the CG command that is:

a first CG command in a case where a region is within a predetermined range from a position indicated by the sight-line information; and a second CG command in which rendering is coarser than that of the first CG command in a case where the region is outside the predetermined range.

7. The system according to claim 3, wherein:

the first plurality of tasks include an encoding task that encodes the modified synthesized image that has been modified by the modification task, the first transmitting task transmits encoded data obtained by the encoding task to the information processing apparatus, the second receiving task receives the encoded data, the second plurality of tasks include a decoding task that decodes the encoded data received by the second receiving task.

8. A control method for an image display system comprising a computer graphics (CG) displaying device that includes an image capturing device that captures an image of a physical space and a display device that displays an image to a user, and an information processing apparatus that transmits information for displaying CG on the display device, the method comprising:

a detecting step of detecting, with the displaying device, via a sensor provided in the displaying device, a position and orientation of the displaying device;

a first transmitting step of transmitting, to the information processing apparatus, with the displaying device, via a first communication interface provided in the displaying device, position and orientation information related to the position and orientation detected in the detecting step and specific information for specifying a frame captured by the image capturing device;

a first receiving step of receiving, with the displaying device, via the first communication interface, a CG command from the information processing apparatus;

a rendering step of rendering, with the displaying device, CG based on the CG command received in the receiving step;

a synthesizing step of synthesizing the CG on to the captured image of the physical space in a case where the specific information of the CG rendered in the rendering step and the specific information of a synthesizing target image match;

a displaying step of displaying, with the displaying device, the rendered CG rendered in the rendering step and an image synthesized in the synthesizing step;

a second receiving step of receiving, from the displaying device, with the information processing apparatus, via a second communication interface provided in the image processing apparatus, the position and orientation information and the specific information;

a CG command generating step of generating, with the information processing apparatus, the CG command based on the position and orientation information and the specific information received in the second receiving step; and a second transmitting step of transmitting, with the information processing apparatus, via the second communication interface, the generated CG command to the displaying device.

9. A non-transitory computer-readable storage medium storing a program executable by at least one processor, of an image display system comprising a computer graphics (CG) displaying device that includes an image capturing device that captures an image of a physical space and a display device that displays an image to a user, and an information processing apparatus that transmits information for displaying CG on the display device, to execute a method comprising:

a detecting step of detecting, with the displaying device, via a sensor provided in the displaying device, a position and orientation of the displaying device;

a first transmitting step of transmitting, to the information processing apparatus, with the displaying device, via a first communication interface provided in the displaying device, position and orientation information related to the position and orientation detected in the detecting step and specific information for specifying a frame captured by the image capturing device;

a first receiving step of receiving, with the displaying device, via the first communication interface, a CG command from the information processing apparatus;

a rendering step of rendering, with the displaying device, CG based on the CG command received in the receiving step;

a synthesizing step of synthesizing the CG on to the captured image of the physical space in a case where the specific information of the CG rendered in the rendering step and the specific information of a synthesizing target image match;

a displaying step of displaying, with the displaying device, the rendered CG rendered in the rendering step and an image synthesized in the synthesizing step;

a second receiving step of receiving, from the displaying device, with the information processing apparatus, via a second communication interface provided in the image processing apparatus, the position and orientation information and the specific information;

a CG command generating step of generating, with the information processing apparatus, the CG command based on the position and orientation information and the specific information received in the receiving step; and a second transmitting step of transmitting, with the information processing apparatus, via the second communication interface, the generated CG command to the displaying device via the communication interface.

* * * * *